United States Patent
Ke et al.

(10) Patent No.: US 11,122,540 B2
(45) Date of Patent: Sep. 14, 2021

(54) LIGHT CONNECTION CONTROL METHOD AND APPARATUS

(71) Applicant: Samsung Electronics Co., Ltd, Suwon-si (KR)

(72) Inventors: Xiaowan Ke, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/802,393

(22) Filed: Feb. 26, 2020

(65) Prior Publication Data

US 2020/0196274 A1 Jun. 18, 2020

Related U.S. Application Data

(63) Continuation of application No. 16/301,412, filed as application No. PCT/KR2017/005026 on May 15, 2017, now Pat. No. 10,750,473.

(30) Foreign Application Priority Data

May 13, 2016 (CN) .......................... 201610320273.3
May 2, 2017 (CN) .......................... 201710302323.X

(51) Int. Cl.
*H04W 68/02* (2009.01)
*H04W 76/10* (2018.01)
(Continued)

(52) U.S. Cl.
CPC ........... *H04W 68/02* (2013.01); *H04W 68/00* (2013.01); *H04W 76/10* (2018.02); *H04W 76/25* (2018.02); *H04W 76/28* (2018.02); *H04W 76/19* (2018.02)

(58) Field of Classification Search
CPC ..... H04W 68/02; H04W 76/28; H04W 68/00; H04W 76/10; H04W 76/25; H04W 76/19
(Continued)

(56) References Cited

U.S. PATENT DOCUMENTS 7,342,901 B1  3/2008 Zhang et al.
8,442,475 B2  5/2013 Antonio et al.
(Continued)

FOREIGN PATENT DOCUMENTS

CN 1480008 A 3/2004
JP 5694555 B2 4/2015

OTHER PUBLICATIONS

Huawei et al., "Consideration on RAN initiated paging", 3GPP TSG-RAN WG3 Meeting #91 bis, Apr. 11-14, 2016, 3 pages, R3-160656.
(Continued)

*Primary Examiner* — Congvan Tran

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

The present application provides a method for light connection control for a User Equipment (UE), comprising the following steps of: acquiring, by a first radio access network node, light connection information for a UE; storing, by the first radio access network node, the acquired light connection Information; and, performing, by the first radio access network node, light connection control of the UE based on
(Continued)

the acquired light connection information for the UE. By adopting the technical scheme disclosed in the present application, the signaling overhead can be saved, and the delay of the UE access network can be reduced.

26 Claims, 16 Drawing Sheets

(51) Int. Cl.
*H04W 68/00* (2009.01)
*H04W 76/25* (2018.01)
*H04W 76/28* (2018.01)
*H04W 76/19* (2018.01)

(58) Field of Classification Search
USPC .......................................................... 455/458
See application file for complete search history.

(56) References Cited

U.S. PATENT DOCUMENTS

| | | | |
|---|---|---|---|
| 8,682,329 B2* | 3/2014 | Kim | H04W 36/0094 455/436 |
| 9,763,192 B1* | 9/2017 | Vivanco | H04W 36/00837 |
| 10,405,296 B2* | 9/2019 | Xu | H04W 8/24 |
| 2002/0072363 A1 | 6/2002 | Riihinen et al. | |
| 2007/0232330 A1 | 10/2007 | Ranganathan | |
| 2009/0298516 A1 | 12/2009 | Ryu et al. | |
| 2010/0004001 A1 | 1/2010 | Tao et al. | |
| 2010/0142485 A1* | 6/2010 | Lee | H04W 36/02 370/331 |
| 2011/0065467 A1* | 3/2011 | Park | H04W 68/08 455/507 |
| 2011/0122809 A1 | 5/2011 | Yun et al. | |
| 2011/0223942 A1 | 9/2011 | Xu et al. | |
| 2012/0120858 A1 | 5/2012 | Das et al. | |
| 2012/0263106 A1 | 10/2012 | Lee et al. | |
| 2013/0217393 A1* | 8/2013 | Nishida | H04W 36/14 455/436 |
| 2014/0211750 A1* | 7/2014 | Larsson | H04L 5/0092 370/330 |
| 2014/0314043 A1 | 10/2014 | Kim et al. | |
| 2015/0031366 A1 | 1/2015 | Lee et al. | |
| 2016/0080979 A1* | 3/2016 | Jin | H04W 48/16 455/440 |
| 2016/0174150 A1 | 6/2016 | Comsa et al. | |
| 2016/0205661 A1* | 7/2016 | Ryu | H04W 68/02 455/458 |
| 2017/0331670 A1 | 11/2017 | Parkvall et al. | |
| 2018/0070331 A1 | 3/2018 | Byun et al. | |
| 2019/0246375 A1 | 8/2019 | Ke et al. | |

OTHER PUBLICATIONS

Intel Corporation, "RAN based paging mechanism", 3GPP TSG-RAN WG3 #91 bis, Apr. 11-15, 2016, 3 pages, R3-160892.
Huawei et al., "General consideration on light connection", 3GPP TSG-RAN WG3 Meeting #91bis, Apr. 11-14, 2016, 3 pages, R3-160655.
CATT, "Considerations on Resume ID", 3GPP TSG RAN3 Meeting #91 bis, Apr. 11-15, 2016, 2 pages, R3-160608.
CATT, "Paging via anchor eNB", 3GPP TSG RAN WG3 Meeting #91 bis, 2 pages, R3-160615.
International Search Report dated Aug. 17, 2017 in connection with International Patent Application No. PCT/KR2017/005026, 4 pages.
Written Opinion of the International Searching Authority dated Aug. 17, 2017 in connection with International Patent Application No. PCT/KR2017/005026, 6 pages.
Huawei et al., "RAN initiated paging optimization in light connection", 3GPP TSG RAN WG2 Meeting #93bis, Apr. 11-15, 2016, R2-162277, 4 pages.
Intel Corporation, "RAN based paging mechanism", 3GPP TSG RAN WG2 Meeting #93bis, Apr. 11-15, 2016, R2-162556, 4 pages.
Office Action dated Mar. 10, 2020 in connection with Chinese Patent Application No. 201710302323.X, 14 pages.
Communication pursuant to Article 94(3) EPC dated Dec. 3, 2020 in connection with European Application No. 17796461.6, 7 pages.
3GPP TR 23.720 V13.0.0 (Mar. 2016), Technical Report, 3rd Generation Partnership Project; Technical Specification Group Services and System Aspects; Study on architecture enhancements for Cellular Internet of Things (Release 13), Mar. 2016, 97 pages.
Huawei, et al., New WI proposal: Signalling reduction to enable light connection for LTE Approval, RP-160540, 3GPP TSG RAN Meting #71, Gothenburg, Sweden, Mar. 7-10, 2016, 7 pages.
Ericsson, "Handling of UEs in RAN during periods of no traffic", 3GPP TSG-RAN WG3 #92, May 23-27, 2016, Tdoc R3-161290, 4 pages.
Office Action dated May 25, 2021 in connection with Japanese Patent Application No. 2018-560031, 7 pages.
Office Action dated Jun. 3, 2021 in connection with India Patent Application No. 201837042574, 6 pages.

* cited by examiner

LIGHT CONNECTION CONTROL METHOD AND APPARATUS

CROSS-REFERENCE TO RELATED APPLICATIONS

This application is a continuation of U.S. patent application Ser. No. 16/301,412 filed on Nov. 13, 2018, which is a 371 of International Application No. PCT/KR2017/005026 filed on May 15, 2017, which claims priority to Chinese Patent Application No. 201610320273.3 filed on May 13, 2016 and Chinese Patent Application No. 201710302323.X filed on May 2, 2017, the disclosures of which are herein incorporated by reference in their entirety.

BACKGROUND

1. Field

The present application relates to the technical field of mobile communications, and in particular to a light connection control method and apparatus.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The modern mobile communications increasingly provide multi-media service of high-rate transmission to users. FIG. 1 is a system architecture diagram of system architecture evolution (SAE), in which:

User Equipment (UE) 101 is a terminal device supporting a network protocol; Evolved-universal Terrestrial Ratio Access Network (E-UTRAN) 102 is a radio access network, including a Base Station (eNodeB/NodeB) which provides an interface for a UE for accessing to a radio network; Mobility Management Entity (MME) 103 is responsible for managing a mobility context, session context and security information of a UE; Serving Gateway (SGW) 104 mainly plays a role of providing a user plane, and the MME 103 and the SGW 104 may in a same physical entity; Packet Data Gateway (PGW) 105 is responsible for charging, legal interception or the like, and may be in the same physical entity as the SGW 104; Policy and Charging Rule Functional Entity (PCRF) 106 provides a Quality of Service (QoS) policy and charging rule; serving GPRS support node (SGSN) 108 is a network node device which provides routing for transmission of data in a Universal Mobile Telecommunication System (UMTS); Home Subscriber Server (HSS) 109 is a home ownership subsystem of a UE, and responsible for protecting user information such as current location of a UE, address of a serving node, user security information, packet data context of a UE.

FIG. 16 is a schematic diagram of initial system architecture of the next generation of network (5G). Wherein, the initial system architecture comprises a NextGen UE, a Next Gen access network or Next Gen radio access network (Next Gen (R)AN), a NextGen Core and a data network. A control plane interface between the Next Gen (R)AN and the NextGen Core is NG2 (also presented as NG-C), and a user plane interface is NG3 (also presented as NG-U). These interfaces are named temporarily, and the use of other names eventually decided by the 3GPP will not influence the main contents of the present disclosure. The NextGen Core further comprises a user plane functional entity and a control plane functional entity.

SUMMARY

In the foreseeable future, there will be more and more intelligent electrical equipment, Internet-based home accessories, which all have access to the network function. On the one hand, the future part of the UE often has the following characteristics: static or low mobility, low-cost, data transmitted or received is often in a small amount of data, and non-continuous. For these UEs, the signaling overhead caused by establishing and releasing a connection is far greater than the amount of data transmitted or received. On the other hand, in order to support more and more real-time applications, such as virtual reality, the access delay of the future mobile communication network is greatly reduced. In order to save the signaling overhead, improve the efficiency of data transmission, and reduce the delay of the UE access network, the existing network still have many problems.

The present disclosure provides a light connection control method and apparatus, by which the signaling overhead can be decreased, and the delay of the UE access network can be reduced.

The present application provides the following technical solutions.

A light connection control method for a User Equipment (UE), comprising the following steps of: acquiring, by a first radio access network node, light connection information for the UE; and performing, by the first radio access network node, light connection control for the UE based on the acquired light connection information for the UE.

Preferably, acquiring, by the first radio access network node, the light connection information for the UE from a second radio access network node, a core network node or the UE.

Preferably, the light connection information for the UE comprises at least one of the following: an identity of the UE, information on whether the UE is allowed to perform light connection, mobility area scope information for the UE, access and roaming information for the UE, a CSG identity list allowing access by the UE, a paging assistant information, and a type information for the UE.

Preferably, the mobility area scope information for the UE comprises at least one of the following: a location area identity, a cell identity, a frequency identity, a frequency band identity, a radio access network node identity, a service area identity, an identity of a network slicing, an identity of a radio access network area; and/or, the information on whether the UE is allowed to perform light connection comprises at least one of the following: whether the UE level is allowed for light connection, whether the UE's bearer level is allowed for light connection, whether the UE's session level is allowed for light connection, whether the UE's QoS flow level is allowed for light connection, whether the UE's service data flow level is allowed for light connection.

Preferably, the paging assistant information comprises at least one of the following: a radio capability of the UE, a recommended paging area, paging attempt information, DRX information of the UE, a paging priority, a coverage enhancement level and a core network domain information and a core network control plane data related information.

Preferably, the performing light connection control for the UE comprises at least one of the following: storing, by the first radio access network node, the received light connection information for the UE; updating, by the first radio access network node, the stored light connection information for the UE according to the received light connection information for the UE; mobility control for the UE; control a paging initiated by a radio access network side for the UE; and determine whether the UE performs light connection; determine whether abandon the buffered UE data.

Preferably, the control paging initiated by a radio access network side comprises at least one of the following: configuring, by the first radio access network node, a paging for the UE according to at least one of the acquired light connection information; determining, by the first radio access network node, a paging area scope for the UE according to at least one of the acquired light connection information; and requesting, by the first radio access network node, other radio access network node to initiate a paging for the UE according to at least one of the acquired light connection information.

Preferably, the mobility control for the UE is mobility area scope for the UE configured by the first radio access network node according to at least one of the acquired light connection information.

A radio access network node apparatus, comprising a receiving module and a controlling module, wherein: the receiving module is configured to acquire light connection information for a UE; and the controlling module is configured to perform light connection control for the UE based on the light connection information for the UE.

Preferably, the radio access network node apparatus further comprising: a storing module is configured to store the light connection information for the UE; and/or a transmitting module; the transmitting module is configured to transmit the light connection information for the UE to other devices.

A light connection control method for a UE, comprising the following steps of: acquiring, by the UE, light connection information for the UE; and performing, by the UE, light connection control for the UE based on the acquired light connection information for the UE.

Preferably, the UE acquires the light connection information for the UE by pre-configuration or the UE acquires the light connection information for the UE from a radio access network node, a core network node or other UEs.

Preferably, the light connection information for the UE comprises at least one of the following: an identity of the UE, information on whether the UE is allowed to perform light connection, mobility area scope information for the UE, access and roaming information for the UE, a CSG identity list allowing access by the UE, a paging assistant information, and a type information for the UE.

Preferably, the performing, by the UE, light connection control for the UE based on the acquired light connection information for the UE comprises at least one of the following: informing, by the UE, the network that the UE moves out of mobility area scope configured to the UE; and determining, by the UE, to accept the UE connection release or UE connection suspension of light connection according to the received light connection information for the UE.

A User Equipment (UE), comprising: a receiving module and a controlling module, wherein: the receiving module is configured to acquire light connection information for the UE; and the controlling module is configured to perform light connection control for the UE based on the light connection information for the UE.

Preferably, the UE further comprising: a transmitting module, and the transmitting module is configured to transmit light connection information for the UE to other devices.

A light connection control method for a User Equipment (UE), comprising the following steps of: determining, by a first node, light connection information for the UE; and transmitting, by the first node, the determined light connection information for the UE to a second node or to the UE.

Preferably, the first node is a second radio access network node or a first core network node; and/or the second node is a first radio access network node or a second core network node.

Preferably, the light connection information for the UE comprises at least one of the following: an identity of the UE, information on whether the UE is allowed to perform light connection, mobility area scope information for the UE, access and roaming information for the UE, a CSG identity list allowing access by the UE, a paging assistant information, and a type information for the UE.

Preferably, the determining, by the first node, light connection information for the UE according to at least one of the following:
whether the UE supports the light connection,
whether the node which the UE access supports the light connection,
whether the request of light connection for the UE is received,
whether the UE allows light connection,
whether the UE is suitable for light connection,
whether the UE service allows light connection,
whether UE service is suitable for light connection,
whether UE bearer allows light connection,
whether UE bearer is suitable for light connection,
whether UE session allows light connection,
whether UE session is suitable for light connection,
whether UE QoS flow allows light connection,
whether UE QoS flow is suitable for light connection,
whether UE service data flow allows light connection,
whether UE service data flow is suitable for light connection.

Preferably, the determining, by the first node, to transmit the light connection information for the UE according to at least one of the following:
the UE needs to be handed over to the first radio access network node,
the UE needs to be transferred to the first radio access network node,
a paging for the UE needs to be initiated under the first radio access network node,
light connection request for the UE is received,
a node which the UE access supports a light connection,
the UE supports light connection,
the UE allows light connection,
the UE is suitable for light connection,
the UE bearer allows light connection,
the UE bearer is suitable for light connection,
the UE service allows light connection, and
the UE service is suitable for light connection.

A network node apparatus, comprising a receiving module and a transmitting module, wherein: the receiving module is configured to determine light connection information for a UE; and the transmitting module is configured to transmit the light connection information for the UE to other devices.

It can be seen from the above technical solution, the radio access network can be called as a main node controlled by UE through identifying the light connection information of the UE, closer to the UE and more flexible to control the UE, which can optimize the paging and mobility control of the UE, can save the signaling established in the process of UE connection release and UE connection setup, and can reduce the delay of the UE access the network.

By adopting the technical scheme disclosed in the present application, the signaling overhead can be saved, and the delay of the UE access network can be reduced.

DETAILED DESCRIPTION

Figure 1:
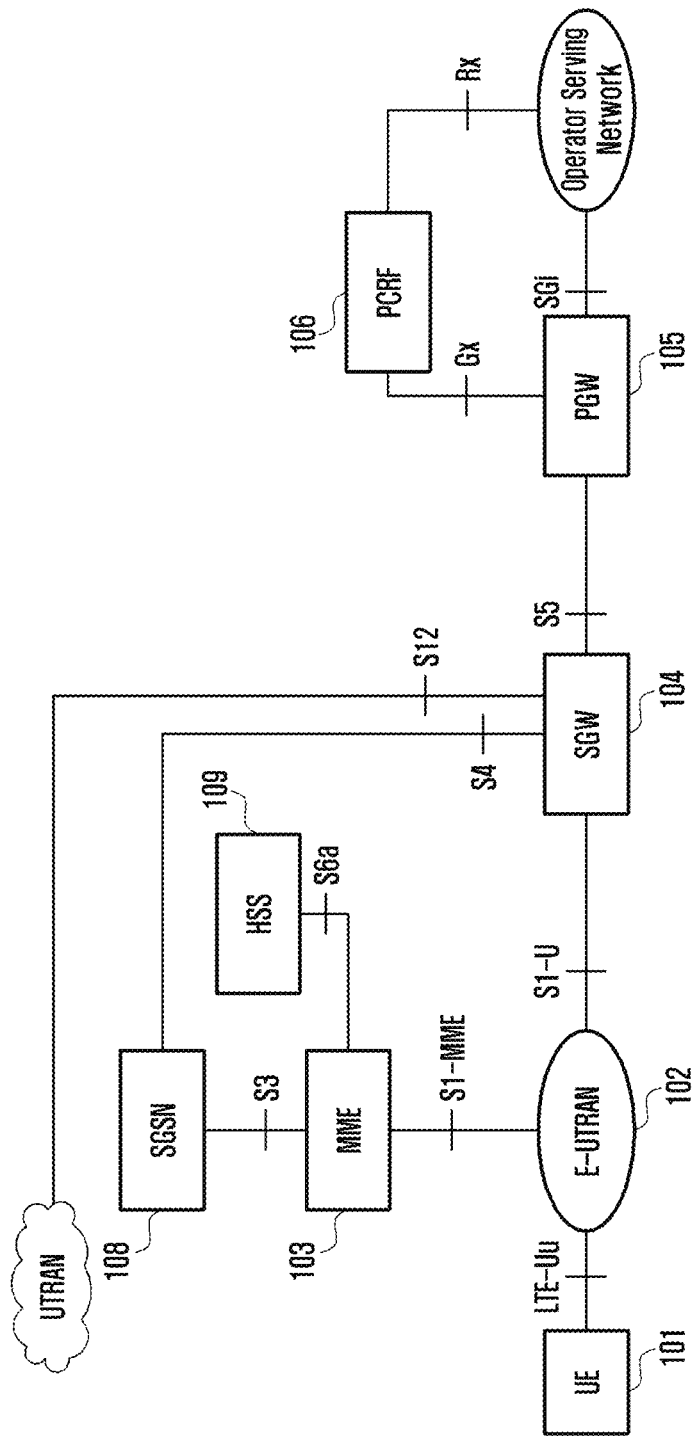
FIG. 1 is a schematic architecture diagram of a method for light connection control according to the present disclosure.

In order to decrease signaling of paging area scope and decrease signaling of service setup, a UE connection mode of light connection is proposed. The light connection means that when the radio access network releases the connection of the UE or when the UE becomes inactive, the radio access network does not request the core network to release a connection for the UE, such as the connection for the UE between the base station and the MME (S1 interface control plane), the connection for the UE between the base station and the SGW (S1 interface user plane), the connection for the UE between the base station and the AMF (NG-C interface control plane), the connection for the UE between the base station and the UPF (NG-U interface user plane). When the UE is in an idle state or inactive, the radio access network still maintains the UE context, and the core network (such as MME, SGW, AMF, SMF, UPF) regards the UE is still in the normal connected state. When there is downlink data, the core network (such as SGW, UPF) transmits data of the UE to the base station. If at this time, the UE is already in the idle state or inactive (such as the connection between the UE and the base station has been disconnected, suspended or being inactive), and if there is downlink data, the base station can initiate a paging for the UE.

When the UE is in the idle state, the existing paging is initiated by the core network. The core network can request the radio access network to page a list of location areas (such as a Tracking area TAC, a list constituted by the TAIs), which can be a mobility area scope of the UE which configured by the core network to the UE. When the UE moves out of the location area in the location list, the UE should update the location area where the UE is located to the core network node. When the UE is in the idle state, in order to transmit a location update request (such as a TAU Request), the UE needs to reestablish a connection with the core network The Prior Art has the Following Problems:

Problem 1: the paging of the light connection is initiated by the radio access network, such as a radio access network node (called a first radio access network node) which releases the UE connection or whose connection with a UE becomes inactive and stores the UE context. When a UE needs to be paged, the first radio access node can page the cell under the first radio access network node or inform the neighboring radio access network node to page the neighboring cell. However, some of these paging cells may not support the list of location areas which is configured by the core network to the UE. At this time, initiating a paging of the UE under these unsupported cells will only waste the resources of the paging.

Problem 2: the mobility area scope of a lightly connected UE can be configured by a radio access network node. Due to the lack of the mobility area scope information configured by the core network to the UE. The mobility area scope configured by the radio access network node to the UE and the mobility area scope configured by the core network node to the UE may lead to a collision.

Problem 3: the paging which is initiated by the radio access network is still lacking the information of the core network side.

Problem 4: the area scope of paging initiated by the radio access network may not only be limited to the radio access network node that initiates the paging, but may also include other radio access network nodes. At this time, the radio access network node that initiated the paging may transmit the page to other radio access network nodes. However, other access network nodes do not have context for the UE.

Problem 5: some UEs or UE service are not suitable for light connection, such as a UE that sleeps for a long time. At present, the radio access network node does not know the type of the UE.

Problem 6: for the core network node, it is unclear whether the assistant light connection information for the UE is needed to provide.

Problem 7: when the core network node transmits a control plane data, a data retransmission timer is initiated. If the data retransmission timer expires and the core network node does not receive acknowledge about the transmitted control plane data, the core network will retransmit the control plane data. For the UE in the light connection, if the control plane data arrives the radio access network node, a radio access network paging is triggered. If the UE does not response and the retransmission timer is expiry, the radio access network node may receive the retransmitted control plane data. The radio access network node cannot distinguish which data is retransmitted. It is not beneficial for buffering multiple repeated data at the radio access network node. Moreover, a transmission of the multiple repeated control plane data to the UE also results in the chaos of the UE and a waste of radio side of resources.

Problem 8: the core network node transmits a control plane data, and the control plane data is not retransmitted endlessly. If a certain number of retransmission is reached, the retransmission process will be terminated. After the termination of the retransmission process, a paging to the UE continuously by the radio access network node is worthless.

The following are some of the descriptions of this application.

In some embodiments, the light connection herein below can also be presented as a paging initiated by the radio access network or an inactive connection or inactive state (e.g., an inactive state in the 5G, or the operation in the inactive state).

In some embodiments, the mobility area scope for the UE mentioned herein below can also be presented as a paging area scope for the UE.

In some embodiments, the handover control list for UEs referred to herein below can also be presented as the UE access and roaming information.

In some embodiments, the radio access network nodes referred to herein below can be a base stations, an eNBs, a NodeBs, Central Control Unit of the radio access network and Distribution Unit of the radio access network node. In the next Generation network, the concept of the node may be virtualized as function or unit. The Central Control Unit of the radio access network may connect with a multiple of Distribution Units of the radio access network node.

In some embodiments, the core network nodes referred to herein below can be an MME, an SGSN, an SGW, a CCNF, an AMF, an SMF, etc. and Core Network Control Node (e.g., MME, CCNF, AMF), Core Network User Plane Node (SMF, UDF), Core Network Control Plan Function, Core Network User Plane Function, Core Network Control Plane Unit and Core Network User Plane Unit and etc. In the next Generation network, the concept of the node may be virtualized as function or unit.

In some embodiments, an radio access network (RAN) area referred to herein below can be an area configured for a UE in light connection by the radio access network. The identity of a RAN area broadcasted by a cell can indicates the RAN area to which the cell belongs. A UE in light connection can also decide whether it has moved out of the mobility area scope configured by the radio access network.

Figure 2:
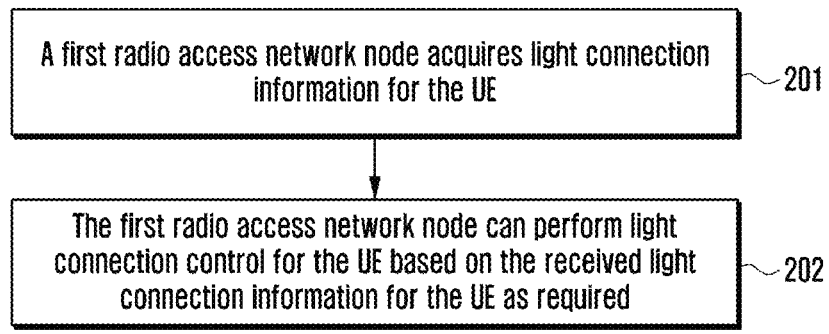
FIG. 2 is a schematic flowchart of a first method for light connection control according to the present disclosure.

FIG. 2 is a schematic flowchart of a first method for light connection control according to the present disclosure, the method includes the following steps.

Step 201, the first radio access network node acquires light connection information for the UE.

Optionally, the first radio access network node receives the light connection information for the UE from at least one of the following: a second radio access network node, a core network node or a UE.

In some embodiments, the first radio access network node can obtain the light connection information for the UE from the core network node, and the light connection information can be obtained from at least one of the following: an initial UE context setup request, a UE context modification request, a downlink NAS request, a paging and a new message.

In some embodiments, the first radio access network node can obtain the light connection information for the UE from a second radio access node, and the light connection information can be obtained from at least one of the following: a paging request, a handover request, a handover response, a Retrieve UE context Request, a Retrieve UE context Response, and a new message.

Optionally, the light connection information for the UE can be presented as at least one of the following: light connection information of the UE, light connection information of the UE bearer, light connection information of the UE service.

Optionally, the light connection information for the UE can contain at least one of the following: an identity of the UE, information on whether the UE is allowed to perform light connections, mobility area scope information for the UE, access and roaming information for the UE, a CSG identity list allowing access by the UE, paging assistant information, and the type information for the UE. The information on whether the UE is allowed to perform light connection can be at least one of the following: whether the UE level is allowed to perform light connection (whether is allowed to perform light connection can be presented as whether the UE is allowed to enter into an inactive state or perform inactive operation), whether the UE bearer level is allowed to perform light connection (e.g., whether a specific UE bear is allowed to perform light connection, which is normally accompanying with an identity for indicating the bearer, such as DRB ID, E-RAB ID, etc.), whether the UE session level is allowed to perform light connection (e.g., whether a specific UE session level is allowed to perform light connection, which is normally accompanying with an identity for indicating the session, such as PDU Session ID, etc.), whether the UE QoS flow level is allowed to perform light connection (e.g., whether a specific UE QoS flow level is allowed to perform light connection, which is normally accompanying with an identity for indicating the session, such as QCI, QoS, Flow ID, etc.), whether the UE service data flow level is allowed to perform light connection (e.g., whether a specific UE service data flow is allowed to perform light connection, which is normally accompanying with an identity for indicating the service flow, such as Service Flow ID, IP quintuple, TFT, etc.)

In some embodiments, whether being allowed to perform light connection can also presented as whether supports to perform light connection or whether is suitable to perform light connection.

1) Optionally, the identity of the UE can comprise at least one of the following: S-TMSI, IMSI, Resume ID, UE Identity Index Value, short Mac_I and C-RNTI. The identity of the UE can be used as a paging identity of the UE or as an identity for acquiring a UE context. The UE identity index value can be used for the radio access network node to calculate the paging cycle of the UE. The identity of the UE can be the identity of the UE at the core network side (such as S-TMSI, IMSI, etc.) and/or the identity of the UE at the radio access network side (such as Resume ID, short MAC_I).

2) The paging assistant information can comprise at least one of the following:

Radio capabilities of the UE (e.g., supported frequency points (e.g. EARFCN, band)). For example, a cell supporting the radio capabilities of the UE can be within the paging area scope of the UE; a cell that does not support the radio capabilities of the UE may not be within the paging area scope of the UE.

Recommended paging area. Optionally, the recommended paging information can comprise at least one of the following: a list of recommended paging cells, a list of recommended paging radio access network nodes.

Paging Attempt Information. Optionally, the paging attempt information can comprise at least one of the following: Paging Attempt Count, Intended Number of Paging Attempts, whether the Next Paging Area Scope is changed.

Discontinuous Reception (DRX) information of the UE. Optionally, the DRX information of the UE can comprise at least one of the following: UE-specific DRX, enhanced DRX of the UE, and a paging time window of the UE under the enhanced DRX. The DRX information for the UE can be used for the radio access network node to calculate the location of the paging frame or paging subframe of the UE.

Paging Priority.

Coverage Enhancement Level, which can correspond to paging repetitions time, such as MPDCCH (Machine Type Communication PDCCH)-repetition. Such as the latest Coverage Enhancement Level.

The Core Network Domain Information (CN Domain).

The core network control plane data related information. The core network control plane data related information can comprises at least one of the following: sequence number of the control plane data, type of the control plane data, indication of whether the control plane data is the retransmitted control plane data, the current retransmission number of the control plane data, duration of the retransmission timer for the control plane data (e.g., a retransmission timer of a NAS PDU), the maximum retransmission number, data valid time of the control plane data (can also be presented as a data valid duration of the control plane data). The type of the control plane data can be the non-access stratum signaling type (e.g., NAS signaling) between the UE and the core network, such as: related NAS signaling of bearer establishment, modification and deletion; related NAS signaling of PDU session establishment, modification and deletion. The core network control plane data related information can be received together with each received control plane data packet or received separately from the control plane data. The receiving mode together with the control plane data packet can be: receiving by an individual information element (IE), receiving by being contained in the header of the control plane data packet, receiving by a uplink or downlink NAS transport message (e.g., UL NAS transport, DL NAS transport).

The data valid time of the control plane data can be calculated by the duration of the retransmission timer for the control plane data and the maximum retransmission number.

The radio access network node can deduce at least one of the following, according to the type of the control plane data: the duration of the retransmission timer for data, the maximum retransmission number and the data valid time of the control plane data. In some of embodiments, different types of control plane data related information are preconfigured at the radio access network node, the control plane data related information comprises at least one of the following: the duration of the retransmission timer for data, the maximum retransmission number and the data valid time of the control plane data.

The radio access network node can deduce that, by the sequence number of the control plane data and/or the received control plane data, whether the current received control plane data is the retransmitted data, the control plane data corresponding to the sequence number of the control plane data is retransmitted.

The radio access network node can deduce that, by the sequence number of the control plane data and/or the indication of whether the control plane data is the retransmitted control plane data, the data valid time of the received control plane data corresponding to the sequence number has been extended to another duration of retransmission timer. The radio access network node can continue the radio access network paging triggered by the control plane data and/or transmit the control plane data to the UE.

The radio access network node can deduce at least one of the following according to the current retransmission number: whether the control plane data is the retransmitted data, whether it is the last retransmission, the data valid time of the control plane data.

3) Optionally, the mobility area scope information for the UE can comprise one or more of the following: a location area identity, a cell identity, a frequency identity, a frequency band identity, a radio access network node identity, a service area identity, an identity of network slicing.

The location identity of the UE, such as TAI, TAC, identity of RAN area and RAI.

Cell identity such as: PCI and ECGI.

Frequency identity such as: EARFCN.

Radio access network node identity such as: eNB ID, eNB UE X2AP ID.

In some embodiments, the mobility area scope for the UE is a mobility area scope for the UE which is configured by the core network node, such as the location area TA. In other embodiments, the mobility area scope for the UE is the mobility area scope for the UE which is configured by the radio access network node to the UE, such as the cells for mobility of a UE in a light connection, or the RAN area for mobility of UE mobility a UE in light connection. The configured RAN area or cells may not beyond the TA area configured for the UE, In some implementations, the UE will trigger location update to the core network when the UE moves out the configured TA area and the UE will become connected. The radio network can take this opportunity to update the mobility area scope for the UE to the UE.

In some embodiments, the UE may not inform the network node when moving within the mobility area scope for the UE, and the UE needs to inform the network when the UE moves out of the mobility area scope for the UE, and initiates a location update request procedure. When the UE is in the idle state, light connection or inactive state, it is necessary to first setup a UE connection, and then initiates the location update request procedure. When the UE moves out of the mobility area scope configured by the core network, it is necessary to inform the core network node of the location update. In some embodiments, when the UE moves out of the mobility area scope configured by the radio access network node, it is necessary to inform the radio access network node of the location update.

In some embodiments, the mobility area scope information for the UE can be configured as paging area scope information for the UE, and the first radio access network node initiates paging for the UE in the mobility area scope for the UE.

4) Optionally, the access and roaming information for the UE can also be represented as one of the following: whether UE being a roaming UE, a range allowing UE access, a range allowing UE roaming, a range not allowing UE access, a range not allowing UE roaming and a handover restriction list.

Optionally, the access and roaming information for the UE comprises at least one of the following: an identity of PLMN allowing access (e.g., a registered and equivalent PLMN), an identity of a location area allowing access, an identity of a cell allowing access, the identity of the radio access network node allowing access, an identity of PLMN identity (e.g., a registration and equivalent PLMN) not allowing access, an identity of the location area not allowing access, an identity of the cell not allowing access, an identity of the radio access network node not allowing access.

In some embodiments, paging can be initiated for UEs in a range that allows UE to access and paging may not be initiated for UEs in a range that does not allow UE to access.

5) Optionally, the type information for the UE comprises at least one of the following: type of the UE, type of the UE bearer, and service type of the UE. In some embodiments, light connection can be performed on some types of the UE, and some of which are not suitable for light connections.

Step 202, the first radio access network node can perform light connection control for the UE based on the received light connection information for the UE as required.

Optionally, the light connection control comprises but not limited to one or more of the following item.

The first radio access network node can store the received light connection information for the UE.

The first radio access network node can update the stored light connection information for the UE according to the received light connection information for the UE.

Mobility control for the UE.

Paging control initiated by the radio access network side for the UE.

Determine whether the UE can perform light connection.

Determine whether to abandon the buffered UE data.

1) Optionally, the paging control initiated by the radio access network side for the UE can comprises at least one of the following:

The first radio access network node can configure the paging resource for the UE according to at least one of the acquired light connection information. The paging resources can be such as paging cycles, paging times, paging frames and paging subframes.

The radio access network node can determine a paging area scope for the UE based on at least one of the acquired light connection information. In some embodiments, the paging area scope determined by the first radio access network node comprises at least one of the following: a paging area scope of the first radio access network node (e.g., a cell under the first radio access network node), a paging area scope of other radio access network nodes (e.g., cells under other radio access network nodes).

The first radio access network node can request other radio access network nodes to initiate a paging for the UE according to at least one of the acquired light connection information. In some embodiments, other radio access network nodes have an interface with the first radio access network node. In other embodiments, the first radio access network node transmits the acquired light connection information to other radio access network nodes which need to initiate a paging for the UE.

In some embodiments, the first radio access network node can configure the paging resource or determine the paging area scope according to at least one of the paging assistant information in step 201.

In some embodiments, the first radio access network node performs paging control according to the received radio capability of the UE. The first radio access network node can initiate paging to a cell and/or other radio access network node supporting a frequency point which is supported by the UE; the first radio access network node may not initiate paging to a cell not supporting a frequency point which is supported by the UE, or other radio access network nodes.

In some embodiments, the first radio access network node can perform paging control according to the received CSG identity list allowing access by the UE In some embodiments, the first radio access network node performs paging control according to the received mobility area scope for the UE. The first radio access network node can initiate paging for the UE to a cell or other radio access network node that supports a mobility area scope indicated by the mobility area scope information for the UE. The first radio access network node may not initiate paging for the UE to cells or other radio access network nodes that do not support the mobility area scope indicated by the mobility area scope information for the UE.

The first radio access network node determines radio access network paging control for the UE (e.g., the UE in light connection or being the inactive) according to the core network node control plane data related information (e.g., the core network control plane data related information as described in step 201), for example, determining the number of paging repeated time or the duration of the paging. If a paging response from the UE is not received, within the data valid time of the control plane data, the first radio access network node can repeat a paging attempt. While the data valid time of the control plane data expires, and if any response from UE is still not received, the first radio access network node can perform at least one of the following: stopping the radio access network paging for the UE, informing the core network node the transmission failure for the control plane data, abandoning the related core network control plane data, informing the core network node that the UE is unreachable, reply the core network node the failure of the radio access network paging, releasing the UE associated connection between the first radio access network and the core network.

2) Optionally, the mobility control for the UE can comprise at least one of the following:

the first radio access network node can configure the mobility area scope for the UE according to at least one of the acquired light connection information.

In some embodiments, the first radio access network node configures the mobility area scope for the UE according to the received handover restriction list. The mobility area scope for the UE, which is configured by the first radio access network node should not be a disallowed range in the handover restriction list.

In some embodiments, the first radio access network node configures the mobility area scope for the UE according to the received mobility area scope for the UE. The mobility area scope for the UE configured by the first radio access network node may not exceed the mobility area scope indicated by the received mobility area scope information for the UE. In some embodiments, a mobility area scope for the UE configured by the first radio access network node that does not exceed a mobility area scope for the UE configured for the UE by the core network node, for example, the first radio access network node may not configure a cell, a RAN area or a base station of a location area (e.g. TA) which not supporting the core network configuration to the UE, as the mobility area scope of the UE.

3) Optionally, determining whether the UE can perform a light connection comprises at least one of the following:

The first radio access network node can determine whether a UE can perform light connection according to at least one of the acquired light connection information.

In some embodiments, the first radio access network node determines whether the UE can perform light connections according to the received indication that whether the UE can perform a light connection. In some embodiments, when the UE is not able to perform light connection, the light connection is not performed.

In some embodiments, the UE may not initiate a location update for a long time in order to save power, such as a UE with enhanced DRX, the first radio access network may not allow the UE to perform light connections. For example: releasing the UE context and releasing the UE associated connection between the radio network and core network when releasing the UE connection between the UE and radio core network.

In some embodiments, the first radio access network node determines whether the UE can perform light connections according to whether the received type of the UE allows the UE to perform light connection.

Now, the method flow of this method ends.

4) Optionally, determining whether the UE can perform a light connection comprises at least one of the following: whether can configure the UE to perform light connection, whether can maintain, release and suspend the UE bearer, whether can maintain, release and suspend the UE session, whether can maintain, release and suspend the UE QoS flow, whether can maintain, release and suspend the UE service data flow. The first radio access network node can determine whether the UE can perform light connection according to the information on whether the UE is allowed to perform light connection.

a) the operation of whether can configure the UE to perform light connection can comprise at least one of the following:

if the UE is not allowed to perform light connection, the first radio access network node may not configure the UE to perform light connection.

if the UE is allowed to perform light connection, the first radio access network node can configure the UE to perform light connection.

b) the operation of whether can maintain, release and suspend the UE bearer can comprise at least one of the following:

if the UE bearer is allowed to perform light connection, when the UE turns into the light connection or the UE bearer becomes inactive (e.g., the UE bearer does not have data transmission for a certain period), the first radio access network node may not release or may maintain a tunnel associated with the UE bearer between the first radio access network node and the core network node. Therefore, if the UE is in light connection, the data of the UE bearer can still directly arrive at the first radio access network node.

if the UE bearer is not allowed to perform light connection, when the UE turns into the light connection or the UE bearer becomes inactive, the first radio access network node can release or suspend the UE bearer, e.g. release or suspend a tunnel for the UE bearer between the first radio access network node and the core network node. Therefore, if the UE is in light connection, the data on the UE bearer is stored at the core network. After the date arrives at the core network, the core network can initiate a core network level paging to the UE or can request the radio access network to establish a UE bearer (e.g., a tunnel for the UE bearer between RAN and CN). After receiving a UE bearer setup request, the first radio access network node can initiate a radio access network paging to the UE. After responding to the core network paging or the radio access network paging, the UE enters into the connected state and can continue to receive and transmit the date on the UE bearer.

c) the operation of whether can maintain, release and suspend the UE session can comprise at least one of the following:

if the UE session is allowed to perform light connection, when the UE turns into the light connection or the UE session becomes inactive (e.g., the UE session does not have data transmission for a certain period), the first radio access network may not release or may maintain a tunnel associated with the UE session between the first radio access network node and the core network node. Therefore, if the UE is in light connection, the data of the UE session level can still directly arrive the first radio access network node.

if the UE session is not allowed to perform light connection, when the UE turns into the light connection or the UE session becomes inactive (e.g., the UE session does not have data transmission for a certain period), the first radio access network request to release or suspend the UE session, e.g. release or suspend a tunnel for the UE session between the first radio access network node and the core network node. Therefore, if the UE is in light connection, the data of the UE session can buffered at the core network node. When the data arrives the core network, the core network can initiate a core network level paging to the UE or the core network can request the radio access network establish a session with UE (e.g., a tunnel for the UE session between RAN and CN). After receiving a UE session setup request, the first radio access network node can initiate a radio access network paging to the UE. After responding to the core network paging or the radio access network paging, the UE enters into the connected state and can continue to receive and transmit the date on the UE session.

if all the UE session is not allowed to perform light connection, the first radio access network node can release the UE instead of configuring the UE to perform light connection if the condition is satisfied.

d) the operation of whether can maintain, release and suspend the UE QoS flow can comprise at least one of the following:

if the UE QoS flow is allowed to perform light connection, when the UE turns into the light connection or the UE QoS flow becomes inactive (e.g., there is no QoS flow data transmission for the UE for a certain period), the first radio access network may not release or may maintain a tunnel associated with the UE QoS flow between the first radio access network node and the core network node. Since the UE QoS flow is transmitted in the tunnel associated with the UE session, the maintained tunnel associated with the UE QoS flow between the first radio access network node and the core network node can be the tunnel associated with the UE session where the QoS flow is located. Therefore, if the UE is in light connection, the data of the UE QoS flow can still directly arrive at the first radio access network node.

if the UE QoS flow is not allowed to perform light connection, when the UE turns into the light connection or the UE QoS flow becomes inactive, the first radio access network node can request UE to de-associate the radio bearer with the QoS flow. The first radio access network node can also request the core network to release the QoS flow. Therefore, if the UE is in light connection, the data of the UE QoS flow can stored at the core network. When the data arrives at the core network, the core network can initiate core network level paging or the core network can request the radio access network node to configure resource for the QoS flow. The first radio access network node can configure radio bearer for the UE QoS flow or associate radio bearer with the UE QoS flow correspondingly.

if none of the QoS flow in the UE session is allowed to perform light connection, when the UE turns into the light connection or all the UE QoS flow in the UE session becomes inactive, the first radio access network node can request to release or suspend the UE session.

if none of the QoS flow in the UE bearer is allowed to perform light connection, when the UE turns into the light connection or all the UE QoS flow in the UE bearer becomes inactive, the first radio access network node can request to release or suspend the UE bearer.

if at least one of the QoS flow in the UE session is allowed to perform light connection, when the UE turns into the light connection or all the UE QoS flow in the UE session becomes inactive, the first radio access network node may not request to release or maintain the tunnel for the UE session between the first radio access network node and the core network node.

if at least one of the QoS flow in the UE bearer is allowed to perform light connection, when the UE turns into the light connection or all the UE QoS flow in the UE bearer becomes inactive, the first radio access network node may not request to release or maintain the UE bearer.

e) the operation of whether can maintain, release and suspend the UE service data flow can comprise at least one of the following:

if the UE service data flow is allowed to perform light connection, when the UE turns into the light connection or the UE service data flow becomes inactive (e.g., there is no service data flow data transmission for the UE for a certain period), the first radio access network may not release or may maintain a tunnel associated with the UE service data flow for the UE between the first radio access network node and the core network node. Since the UE service data flow is transmitted in the tunnel of the UE session, the maintained tunnel associated with t UE service data flow the UE between the first radio access network node and the core network node can be the tunnel associated with the UE session where the service data flow is located. Therefore, if the UE is in light connection, the data of the UE service data flow can still directly arrive at the first radio access network node.

if the UE service data flow is not allowed to perform light connection, when the UE turns into the light connection or the UE service data flow becomes inactive, the first radio access network node can request to release or suspend the radio bearer associated with the service data flow. The first radio access network node can also request the core network to release the service data flow. Therefore, if the UE is in light connection, the data of the UE service data flow can stored at the core network. When the data arrives at the core network, the core network can initiate core network level paging or the core network can request the radio access network node to configure resource for the service data flow. The first radio access network node can configure radio bearer for the UE service data flow correspondingly.

if none of the service data flow in the UE session is allowed to perform light connection, when the UE turns into the light connection or all the UE service data flow in the UE session becomes inactive, the first radio access network node can request to release or suspend the UE session.

if none of the service data flow in the UE QoS flow is allowed to perform light connection, when the UE turns into the light connection or all the UE service data flow in the UE QoS flow becomes inactive, the first radio access network node can request to release or suspend the UE QoS flow.

if none of the service data flow in the UE bearer is allowed to perform light connection, when the UE turns into the light connection or all the UE service data flow in the UE bearer becomes inactive, the first radio access network node can request to release or suspend the UE bearer.

if at least one of the service data flow in the UE session is allowed to perform light connection, when the UE turns into the light connection or all the UE service data flow in the UE session becomes inactive, the first radio access network node may not request to release or maintain the tunnel for the UE session between the first radio access network node and the core network node.

if at least one of the service data flow in the UE QoS flow is allowed to perform light connection, when the UE turns into the light connection or all the UE service data flow in the UE QoS flow becomes inactive, the first radio access network node may not request to release or maintain the UE QoS flow.

if at least one of the service data flow in the UE bearer is allowed to perform light connection, when the UE turns into the light connection or all the UE service data flow in the UE bearer becomes inactive, the first radio access network node may not request to release or maintain the UE bearer.

5) Optionally, determining whether to abandon the buffered UE data comprises one of the following: whether to abandon the repeated control plane data or abandon the buffered UE data.

The first radio access network node can determine whether to abandon the repeated control plane data according to the core network control plane data related information (e.g., the core network control plane data related information as described in step 201). When the first radio access network node confirms to receive the retransmitted control plane data, and if the retransmitted old control plane data has not been transmitted yet or has not been transmitted successfully, the first radio access network node can perform at least one of the following: deleting the retransmitted old control plane data, stopping the paging related to the retransmitted old control plane data, deleting the retransmitted control plane data.

Figure 3:
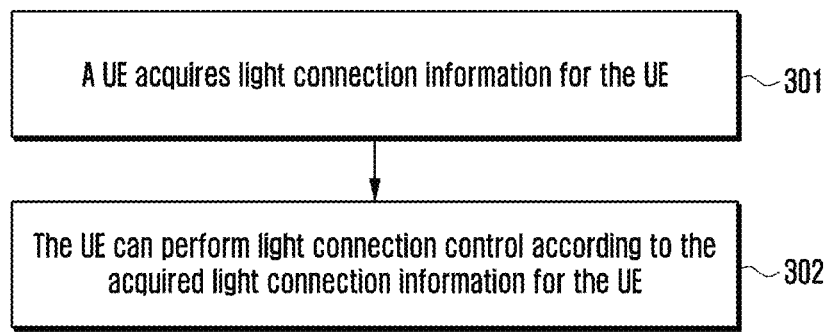
FIG. 3 is a schematic flowchart of a second method for light connection control according to the present disclosure.

FIG. 3 is a schematic flowchart of a second method for light connection control according to the present disclosure, the method includes the following steps.

Step 301, the UE acquires light connection information for the UE.

Optionally, the UE can acquire light connection information for the UE by pre-configuration, or the UE can receive light connection information for the UE from at least one of the following: a radio access network node and a core network node.

Optionally, the light connection information for the UE is as described in step 201.

Step 302, the UE can perform light connection control according to the acquired light connection information for the UE.

Optionally, the UE performs at least one of the following:

The UE informs the network that the UE moves out of the mobility area scope configured for the UE. When the UE moves out of the mobility area scope configured for the UE, the UE needs to inform the network, for example, initiating a connection setup, a connection resume or a location update request to the network. In some embodiments, when moving out of the mobility area scope configured by the core network for the UE, the UE initiates a location update request to the core network. In other embodiments, the UE moves out of the mobility area scope configured by the radio access network for the UE by the radio access network, the UE initiates a connection setup or connection resume procedure. If the received radio access network node is not the radio access network node that stored the UE context, the UE context can be acquired from a radio access network which stored the UE context.

The UE can determine to accept the UE-connection release or UE-connection suspension of the light connection, according to the received light connection information for the UE.

The UE transmits the light connection information for the UE to the radio access network or the core network node. For example, upon moving to another radio access network node, the UE transmits the acquired light connection information for the UE to the radio access network node to which the UE accesses or the core network node to which the UE accesses.

Now, the method flow in this method ends.

Figure 4:
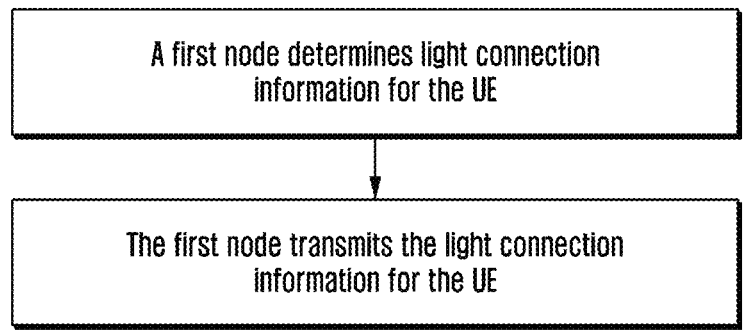
FIG. 4 is a schematic flowchart of a third method for light connection control according to the present disclosure.

FIG. 4 is a schematic flowchart of a third method for light connection control according to the present disclosure, the method includes the following steps.

Step 401, the first node determines the light connection information for the UE.

Optionally, the first node can be at least one of the following: a radio network node and a core network node. The first node can be a second radio network node or a first core network node.

Optionally, the first node can determine whether the UE can perform a light connection according to at least one of the following:

Whether the UE supports the light connection;

Whether the node which the UE access supports light connection. The node can be at least one of the following: a radio access network node and a core network node;

Whether a light connection request for the UE is received. The light connection request for the UE can come from a UE or a node which the UE access. Optionally, the light connection request for the UE can be present as a new radio state for the UE;

Whether the UE allows light connection. For example, whether the subscription data of the UE allows light connections;

Whether the UE is suitable for light connection. For example, a UE in the power saving mode for a long time, a UE not updating the location of the network for a long time, a UE moving fast;

Whether the UE service allows light connection;

Whether the UE service is suitable for light connection;

Whether the UE bearer allows light connections;

Whether the UE bearer is suitable for light connection;

Whether the UE session allows light connections;

Whether the UE session is suitable for light connection;

Whether the UE QoS flow allows light connections;

Whether the UE QoS flow is suitable for light connection;

Whether the UE service data flow allows light connections;

Whether the UE service data flow is suitable for light connection.

Optionally, the new radio state can be a radio state (such as RRC state) that the UE remains in connected state with the core network node, after the connection (such as new RRC state, e.g. inactive RRC state) between the UE and the radio access network is disconnected, suspended or being inactive.

In some embodiments, whether a light connection is supported can be present in at least one of the following: whether to support user plane CIOT EPS optimization, whether to support RRC connection suspend, whether to support RRC connection resume, and whether to support a new radio state (the new radio state as described above).

In other embodiments, whether the light connection is allowed can be present at least one of the following: whether to allow user plane CIOT EPS optimization, whether to allow RRC connection suspend, whether to allow RRC connection resume, whether to allow a new radio state (the new radio state as described above).

Step 402, the first node transmits the determined light connection information for the UE.

Optionally, the first node transmits the light connection information to the second node or to the UE. The second node can be a first radio access network node, or a second core network node.

In some embodiments, the first node transmits light connection information for the UE in at least one of the following scenarios:

The UE needs to be handed over to the first radio access network node. For example, the second access network node determines to handover the UE to the first radio access network node.

The UE needs to be handed over to the first radio access network node. For example, the UE accesses the first radio access network node while the UE context is still stored in the second access network node.

A paging for the UE needs to be initiated under the first radio access network node.

A light connection request for the UE is received. In some embodiments, the light connection request for the UE can be transmitted by the first radio access node or a UE. Optionally, the light connection request for the UE can be present as a new radio state for the UE.

The node which the UE access supports light connection.
The UE supports light connection.
The UE allows light connection.
The UE is suitable for light connection.
The UE bearer allows light connection.
The UE bearer is suitable for light connection.
The UE service allows light connections.
The UE service is suitable for light connection.
The UE session allows light connection.
The UE session is suitable for light connection.
The UE service QoS flow allows light connections.
The UE service QoS flow is suitable for light connection.
The UE service data flow allows light connections.
The UE service data flow is suitable for light connection.
Now, the method flow of this method ends.

The specific content of the light connection information for the UE that appears below all refers to the light connection information for the UE in step 201, which will not be described later.

Embodiment 1

Figure 5:
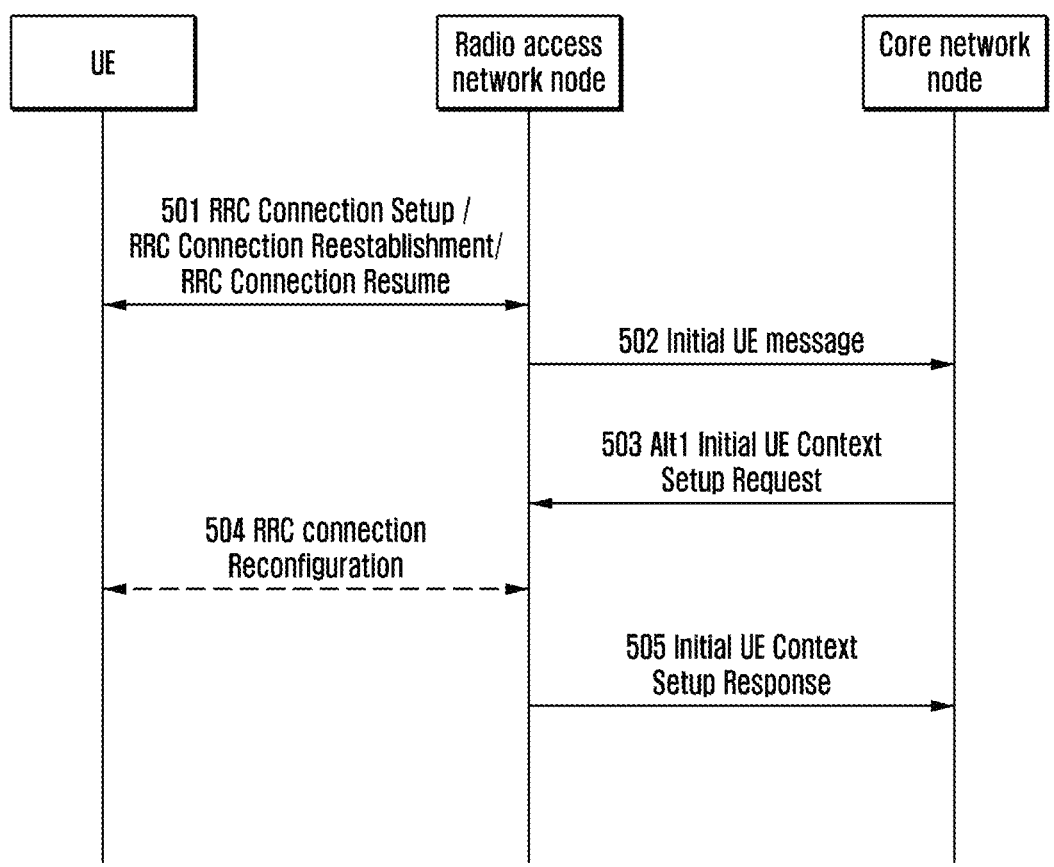
FIG. 5 is a schematic diagram of Embodiment 1 of a method for light connection control according to the present disclosure.

FIG. 5 is a schematic diagram of Embodiment 1 of a method for light connection control according to the present disclosure. When a connection for a UE is established, a radio access network node receives light connection information for the UE. The radio access network node can perform light connection control for the UE based on the received light connection information for the UE as required. As shown in FIG. 5, the method comprises the following steps.

Step 501, an RRC connection is established between the UE and the radio access network node. The connection can be implemented by the procedure of RRC connection setup, RRC connection resume or RRC connection reestablishment.

Step 502, the radio access network node transmits an initial UE message to a core network node. Optionally, the message contains a light connection request for the UE (as described in step 402).

Step 503, the core network node transmits an initial context setup request message, a UE connection setup indication message, or a downlink NAS message to the radio access network node. Optionally, the message comprises the light connection information for the UE (as described in step 201). Optionally, the core network node can determine whether to transmit light connection information for the UE according to whether the radio access network node supports the light connection.

The radio access network node stores the received light connection information for the UE and performs UE light connection control as required. The specific operation is described in step 202, and the description will not be repeated here.

Step 504, the radio access network node can transmit an RRC reconfiguration request message to the UE. The RRC reconfiguration request message can contain light connection information for the UE (as described in step 201). The UE can determine to accept the connection release or connection suspension of the light connection, according to the received light connection information for the UE, the specific operation is described in step 302, and will not be repeated here.

The UE can return an RRC reconfiguration completion message to the radio access network node.

Step 505, the radio access network node can return an initial UE context setup response to the core network node.

Now, the method flow of this embodiment ends.

Embodiment 2

Figure 6:
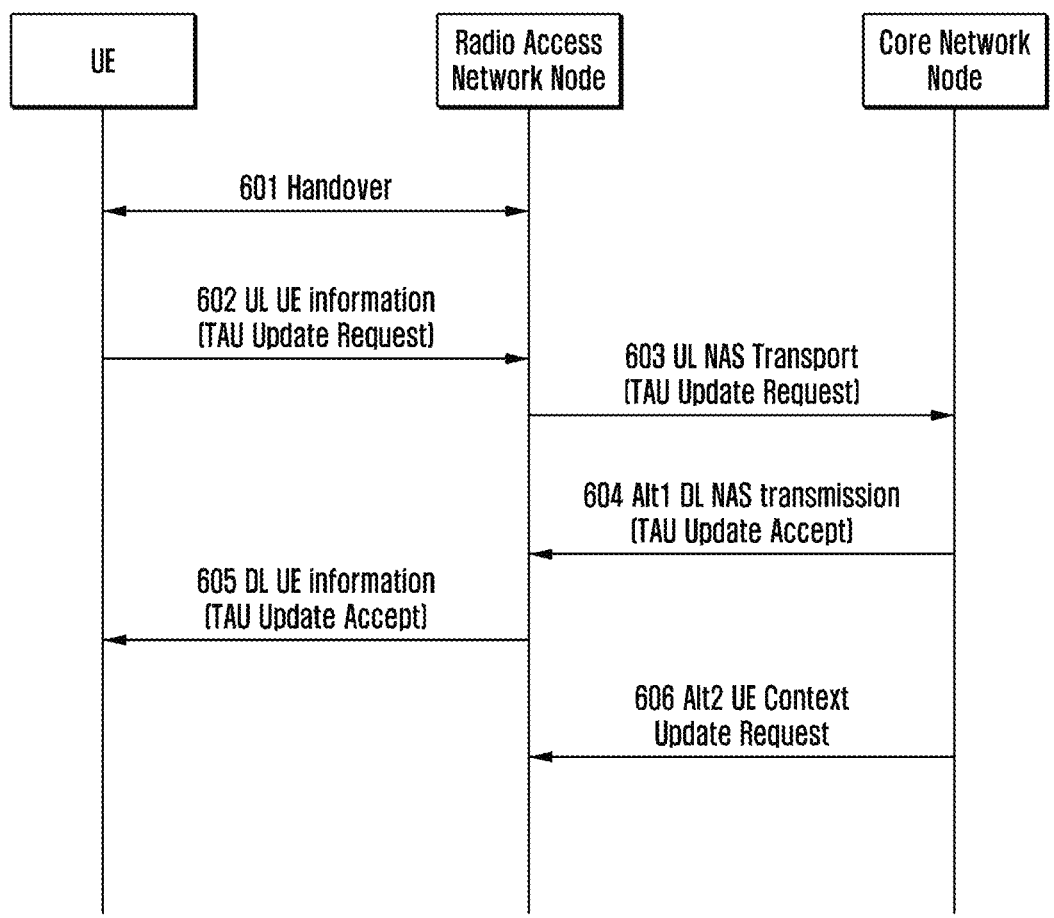
FIG. 6 is a schematic diagram of Embodiment 2 of a method for light connection control according to the present disclosure.

FIG. 6 is a schematic diagram of a second Embodiment 2 of a method for light connection control according to the present disclosure. When a UE initiates a location update procedure to the core network and the UE is in a normal connected state, the core network node updates light connection information for the UE to the radio network node. The radio access network node can control the UE based on the updated light connection information for the UE as required. As shown in FIG. 6, the method comprises the following steps:

Step 601, the UE performs a handover. The location area of the target cell after the handover is out of the mobility area scope of the UE (described in step 201).

Step 602, the UE transmits an uplink UE information message to the radio access network node, the message carries a NAS message TAU update request.

Step 603, the radio access network node forwards the received NAS message TAU update request to the core network node through an Uplink NAS Transport message. After receiving the light connection information for the UE, the core network node updates the light connection information for the UE to the radio access network in two ways. The two ways are step 604, step 605, and step 606, respectively.

Step 604, the core network node transmits a Downlink NAS Transport message to the radio access network node. Optionally, the Downlink NAS Transport message contains the light connection information for the UE. The radio access network node can update the stored light connection information for the UE according to the received light connection information for the UE, such as a mobility area scope configured by the core network for the UE and a list of location areas TA.

Step 605, the radio access network node transmits a downlink UE information message to the UE.

Step 606, the core network node transmits a UE Context Modification Request message to the radio access network node. Optionally, the message contains the light connection information for the UE. The radio access network node can update the stored light connection information for the UE according to the received light connection information for the UE, such as the mobility area scope configured by the core network for the UE and the list of location areas TA.

Now, the method flow of this embodiment ends.

In some embodiments, the mobility area scope for the UE is a list of location areas (e.g., a list of TA (Tracking area) identities) configured by the core network node for the UE. The radio access network node may not initiate paging to a cell or other radio access network node that does not support a list of location areas configured for the UE, and can initiate a paging to a cell or other radio access network node that supports a list of location areas configured for the UE. When the radio access node notifies the other UEs of paging the UE, the list of the location area of the core network node configured for the UE can be transmitted to other radio access nodes.

Embodiment 3

Figure 7:
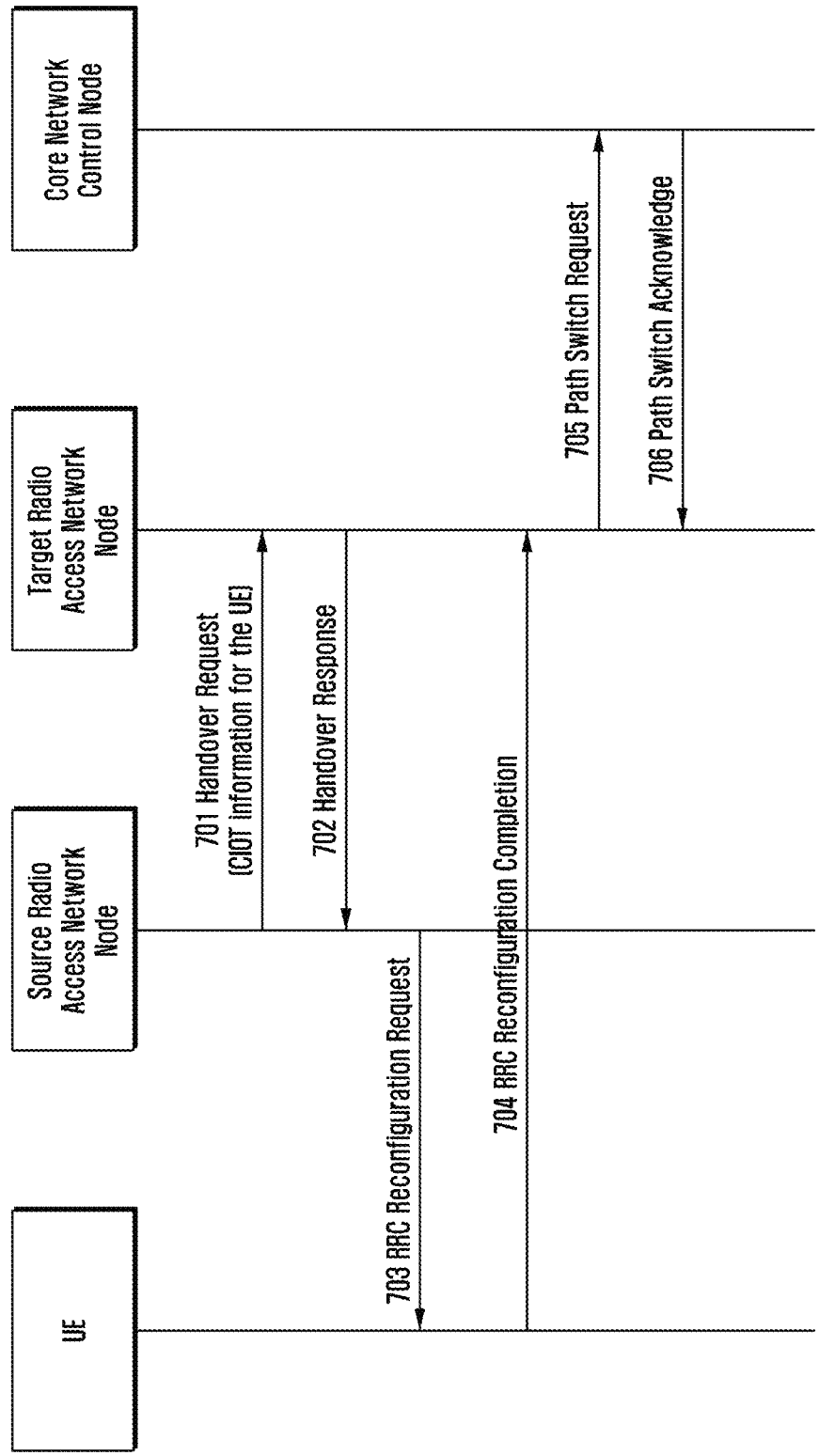
FIG. 7 is a schematic diagram of Embodiment 3 of a method for light connection control according to the present disclosure.

FIG. 7 is a schematic diagram of Embodiment 3 of a method for light connection control according to the present disclosure. When the UE perform a handover between radio access network nodes (e.g., X2 handover), the target radio access network node receives light link information for the UE. The target radio access network node can control the UE according to the received light connection information for the UE. As shown in FIG. 7, the method comprises the following steps.

Step 701, the source radio access network node transmits a handover request message to the target radio access network node. Optionally, the handover request message contains light connection information for the UE. The target radio access node stores the received light connection information for the UE. Optionally, the source radio access network node can determine whether to transmit light connection information for the UE according to whether the target radio access network node supports the light connection.

Specifically, the light connection information for the UE is as described in step 201, and will not be repeated here.

Step 702, the target radio access network node returns a handover response to the source radio access network node.

Step 703, the source radio access network node transmits a RRC reconfiguration request to the UE.

Step 704, the UE returns an RRC configuration completion to the target radio access network node.

Step 705, the target radio access network node transmits a path switch request to the core network node.

Step 706, the core network node transmits a path switch acknowledge message to the target radio access network node. Optionally, the transmitted path switch acknowledge message contains light connection information for the UE. The target radio access network node can store the received light connection information for the UE. If the light connection information for the UE already exists, the target radio access network node can update the light connection information based on the received light connection information for the UE.

After the handover is complete, the target radio access network node becomes the radio access network node serving the UE. The radio access network node can control the UE according to the stored light connection information for the UE. The specific operation is described in step 202, and will not be repeated here.

Now, the method flow of this embodiment ends.

Embodiment 4

Figure 8:
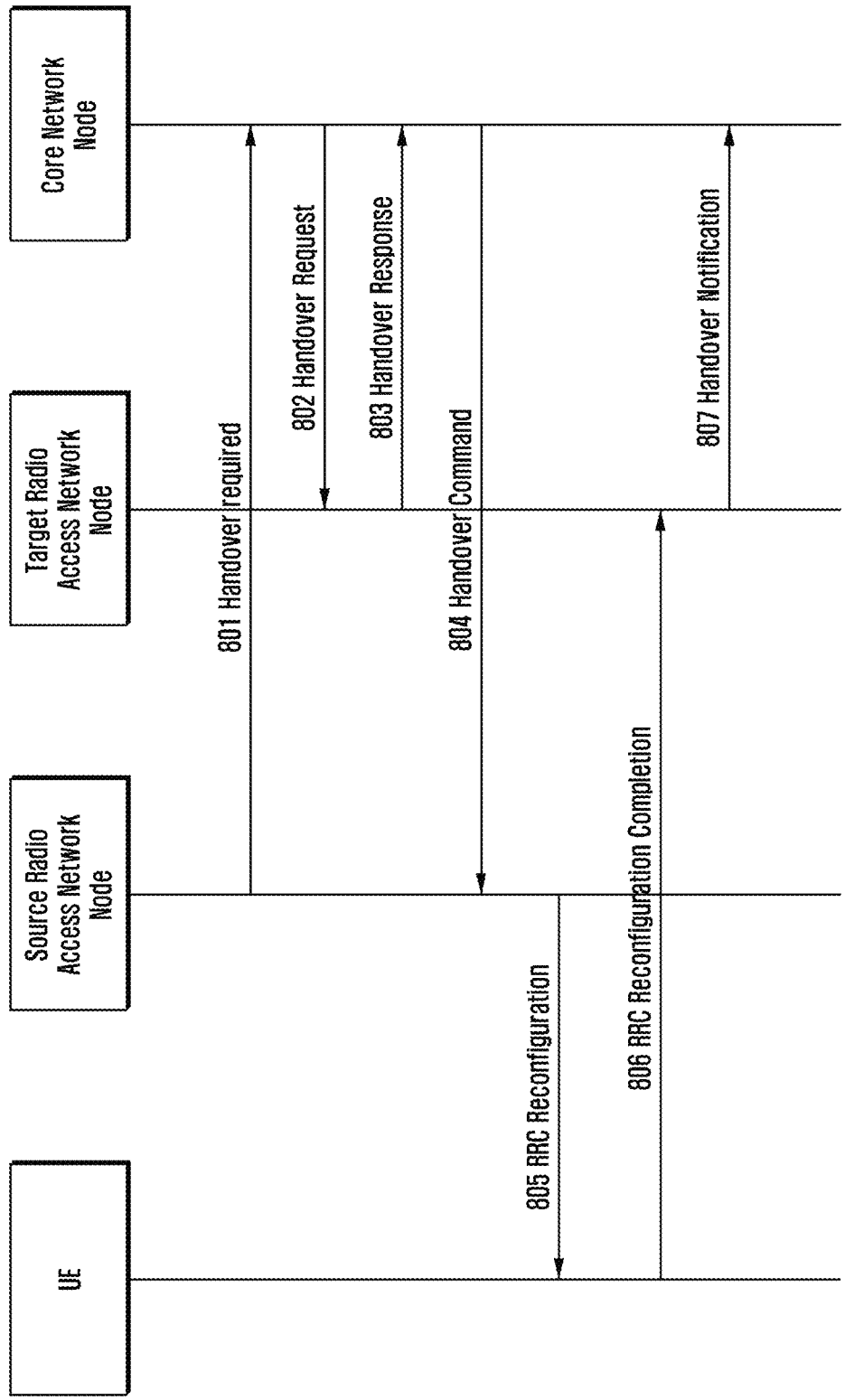
FIG. 8 is a schematic diagram of Embodiment 4 of a method for light connection control according to the present disclosure.

FIG. 8 is a schematic diagram of Embodiment 4 of a method for light connection control according to the present disclosure. The target radio access network node can control the UE according to the received light connection information for the UE when the UE performs a handover by the core network between the radio access network nodes (such as S1 handover). As shown in FIG. 8, the method comprises the following steps. There are two ways to inform the target radio access node of light connection information for the UE, which are step 801 and step 802, respectively.

Step 801, the source radio access network node initiates a handover required to the core network node. Optionally, the message can contain light connection information for the UE. The core network node forwards the light connection information for the UE to the target radio access network node. Optionally, the core network node can further in combination with whether the target radio access node supports the light connection, determine the light connection information for the UE or whether to hand over the CIOT bearer.

The light connection information for the UE is as described in step 201, and will not be repeated here.

Step 802, the core network node initiates a handover request to the target radio access network node. Optionally, the message can contain light connection information for the UE. The contained light connection information for the UE can be the light connection information for the UE which is received by the core network node from the source radio access network node, or can be the light connection information for the UE which is directly generated by the core network node.

The light connection information for the UE is as described in step 201, and will not be repeated here.

The target radio access network node stores the light connection information for the UE received from the core network node.

Step 803, the target radio access network node transmits a handover response to the core network node.

Step 804, the core network node transmits a handover response to the source radio access network node.

Step 805, the source radio access network node transmits an RRC reconfiguration command to the UE.

Step 806, the UE transmits a reconfiguration completion to the target radio access network node.

Step 807, the target radio access network node transmits a handover notification to the core network node to inform that the handover is completed. After the handover is completed, the target radio access network node becomes the radio access network node serving the UE, and the radio access network node can perform access control on the UE according to the received light connection information for the UE, specific operation is as described in step 202, and will not be repeated here.

Now, the method flow of this embodiment ends.

Embodiment 5

Figure 9:
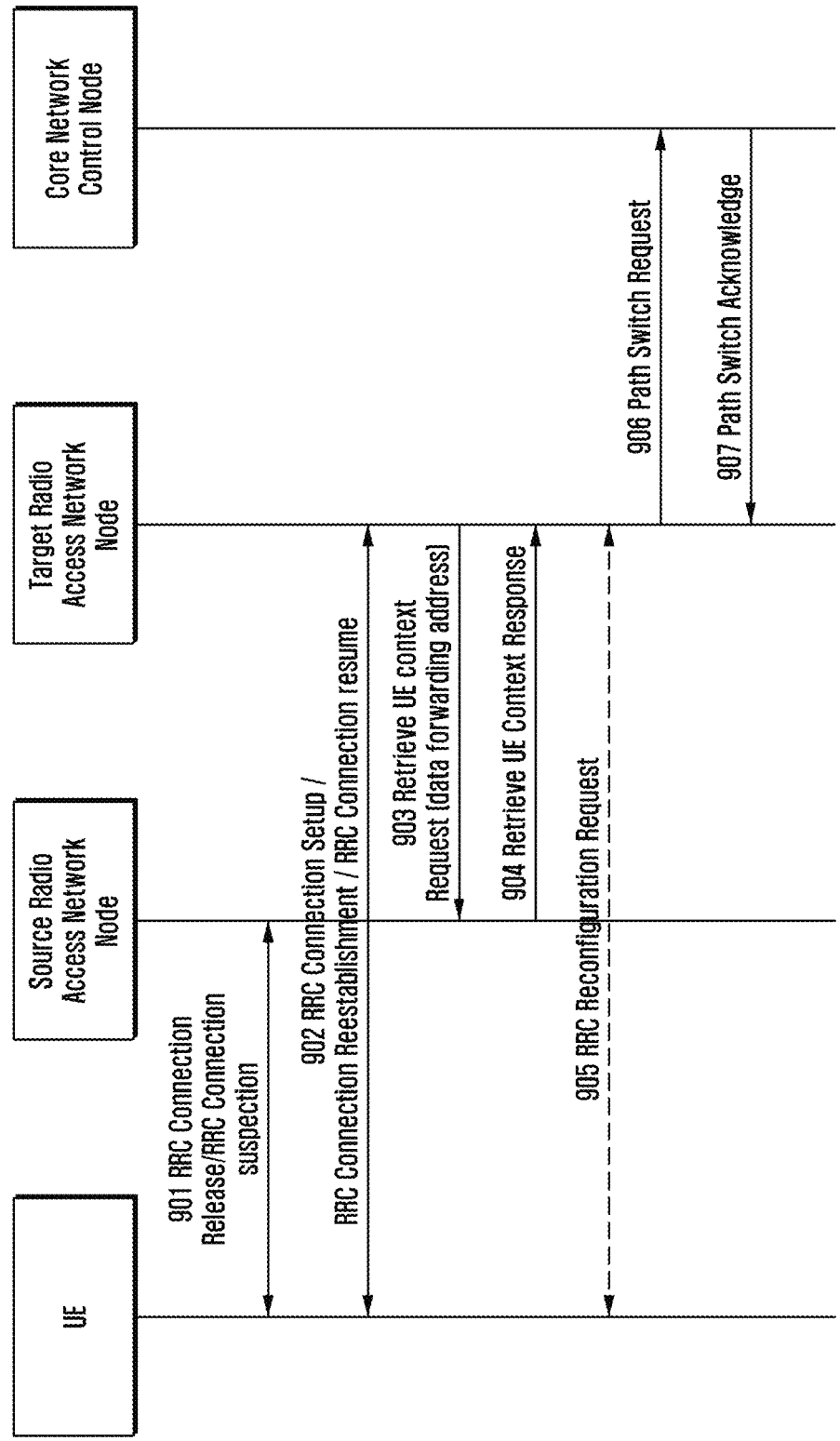
FIG. 9 is a schematic diagram of Embodiment 5 of a method for light connection control according to the present disclosure.

FIG. 9 is a schematic diagram of Embodiment 5 of a method for light connection control according to the present disclosure. After the UE is disconnected from the source radio access network, the UE enters the state of light connection. The UE determines to initiate a connection setup while moving to the target radio access network. The reason why the UE initiates a connection setup can be that the UE moves out of the preconfigured mobility area scope/the mobility area scope configured by the radio access network, being with data transmission requirement or response paging. As shown in FIG. 9, the method comprises the following steps.

Step 901, the source radio access network node is disconnected from the UE. When the RRC connection is released or the RRC connection is suspended, the source radio access network node can transmit the mobility area scope configured for the UE to the UE. The mobility area scope information for the UE configured by the radio access network node is as described in step 201.

Step 902, an RRC connection is setup between the UE and the target radio access network node. The RRC connection can be implemented through RRC connection setup, RRC connection resume or RRC connection reestablishment procedure. The target radio access network node identifies the source radio access network node of the UE.

Step 903, the target radio access network node initiates a Retrieve UE context Request to the source radio access network node. Optionally, the message contains a data forwarding address, such as a downlink data forwarding address.

Step 904, the source radio access network node authenticates the UE and transmits a Retrieve UE context Response to the target radio access network node. Optionally, the Retrieve UE context Response message contains the light connection information for the UE.

Step 905, an RRC connection is setup between the UE and the target radio access network node. The RRC connection can be implemented through RRC connection setup, RRC connection resume or RRC connection reestablishment procedure.

Step 906, the target radio access network node performs RRC connection reconfiguration of the UE as required. Optionally, the RRC connection reconfiguration request contains light connection information for the UE.

Step 907, the target radio access network node transmits a path switch request to the core network node.

Step 908, the core network node transmits a path switch acknowledge to the target radio access network node.

Now, the method flow of this embodiment ends.

Embodiment 6

Figure 10:
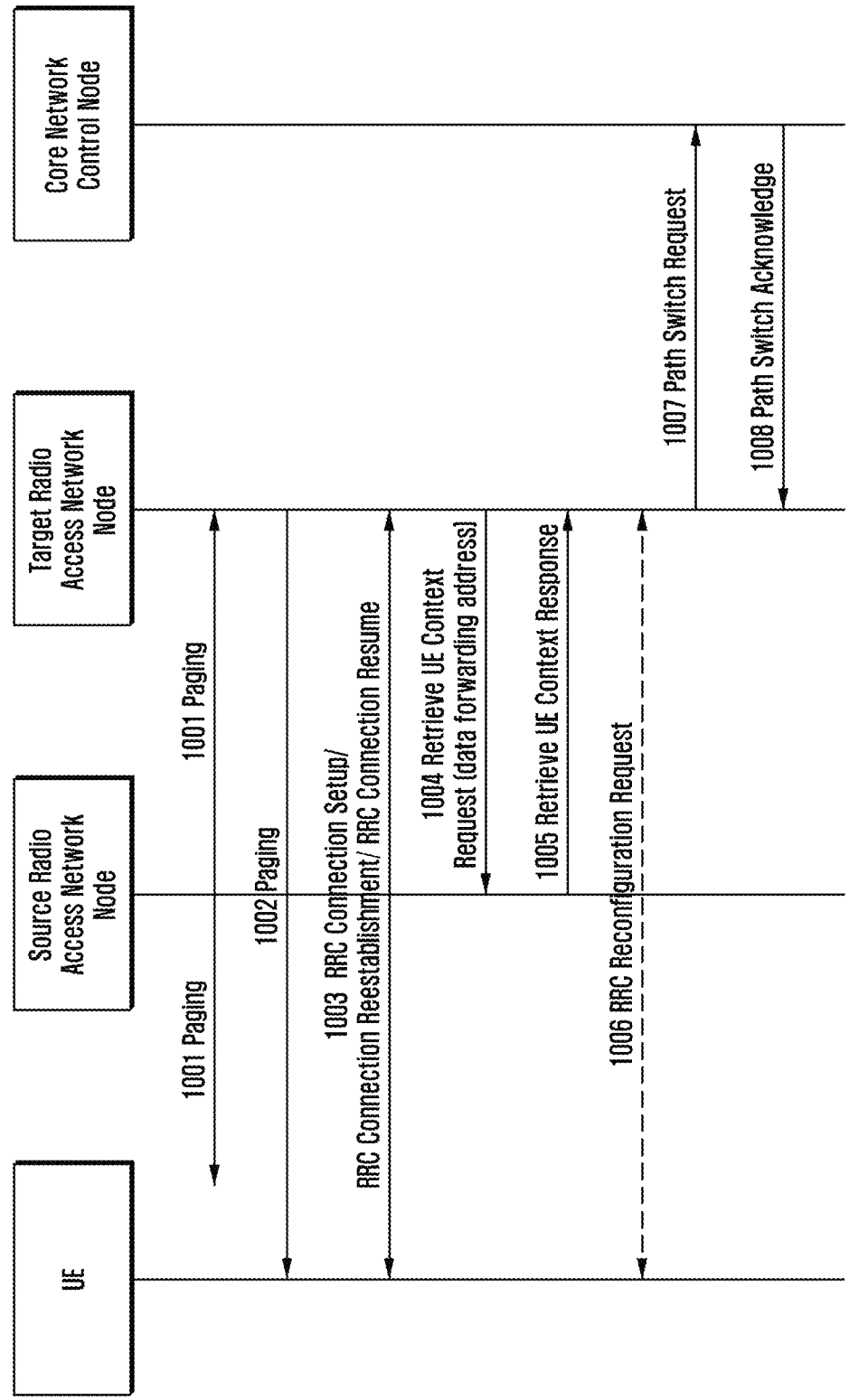
FIG. 10 is a schematic diagram of Embodiment 6 of a method for light connection control according to the present disclosure.

FIG. 10 is a schematic diagram of Embodiment 6 of a method for light connection control according to the present disclosure. After the UE is disconnected from the source radio access network, it enters the state of light connection. When a source radio access network node needs to paging the UE, the source radio access network node transmits the paging for the UE to the target radio access network for paging control. As shown in FIG. 10, the method comprises the following steps.

Step 1001, the source radio access network node transmits a paging for the UE to the UE or the target radio access network node. Optionally, the paging message contains light connection information for the UE.

Step 1002, the target radio access network node performs paging control for the UE according to the received light connection information for the UE, the paging control as described in step 202, and will not be repeated here.

If the UE receives a paging at the target radio access network node, the UE initiates a connection setup to perform a paging response. Steps 1003 to 1008 are as described in steps 902 to 907, and will not be repeated here.

Now, the method flow of this embodiment ends.

Embodiment 7

Figure 11:
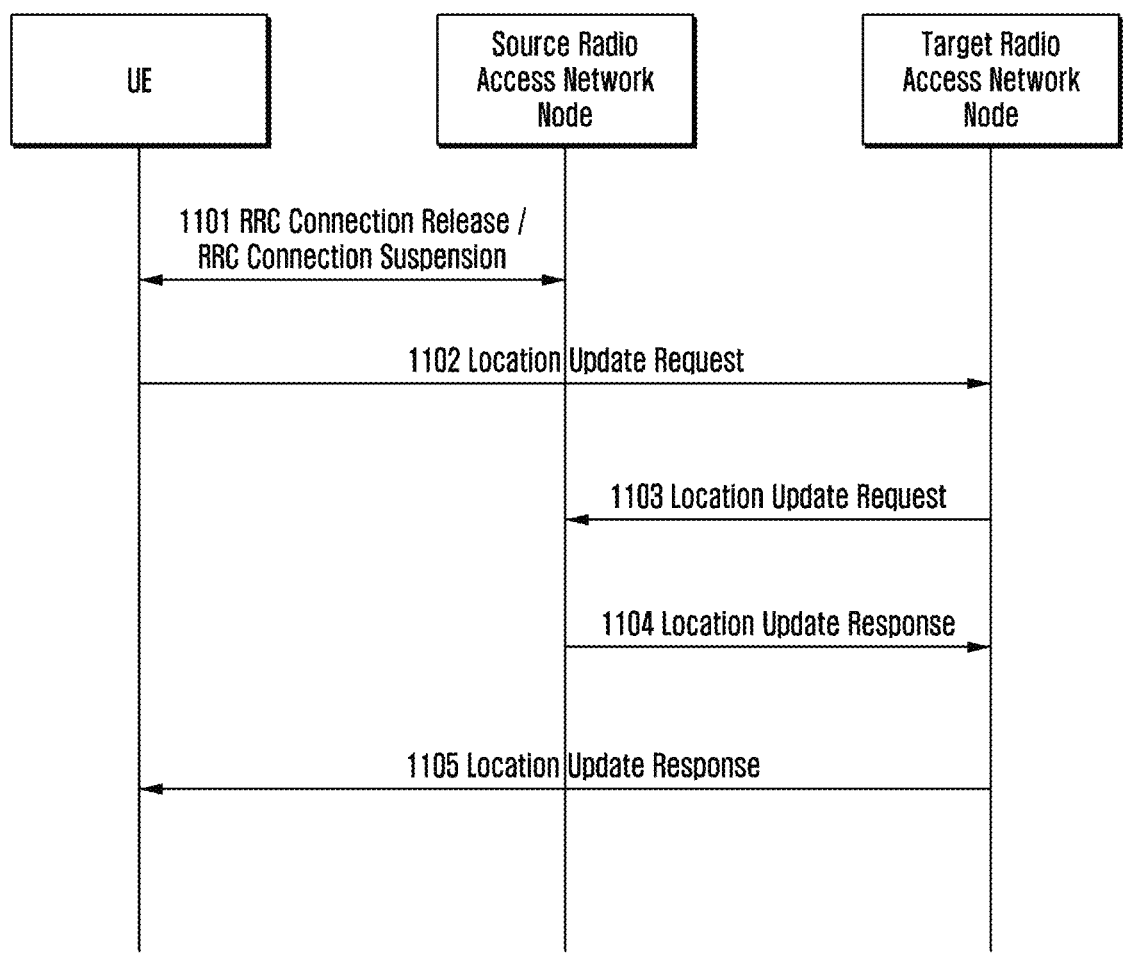
FIG. 11 is a schematic diagram of Embodiment 7 of a method for light connection control according to the present disclosure.

FIG. 11 is a schematic diagram of Embodiment 7 of a method for light connection control according to the present disclosure. After disconnected from the source radio access network, the UE enters the state of light connection. The UE initiates a location update procedure after it has moved out of the mobility area scope configured by the source radio access network node. As shown in FIG. 11, the method comprises the following steps.

Step 1101 is as described in step 901, and will not be repeated here.

Step 1102, the UE moves out of the mobility area scope and initiates an RRC connection setup or an RRC connection resume. Optionally, a UE location update is indicated in the message.

Step 1103, the target radio access network node transmits a location update request for the UE to the source radio access network node.

Step 1104, the source radio access network node transmits a location update response for the UE to the target radio access network node. Optionally, the location update response message contains light connection information for the UE.

Step 1105, the target radio access network node transmits a location update response message to the UE. Optionally, the location update response message contains the light connection information for the UE.

Figure 12:
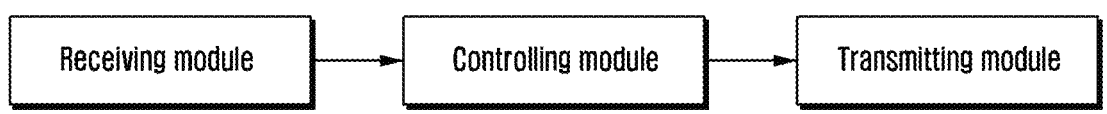
FIG. 12 is a schematic architecture diagram of a preferred radio access network apparatus according to the present disclosure.

FIG. 12 is a schematic architecture diagram of a preferred radio access network apparatus according to the present disclosure. As shown in FIG. 12, the radio access network apparatus comprises a receiving module, a controlling module and a transmitting module, wherein, the receiving module is configured to acquire light connection information for the UE; the controlling module is configured to perform light connection control for the UE based on the light connection information for the UE; and the transmitting module is configured to transmit the light connection information for the UE to other devices.

Figure 13:
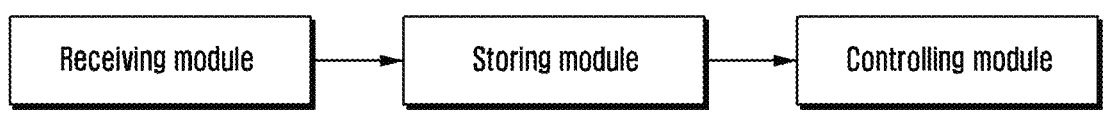
FIG. 13 is a schematic architecture diagram of a preferred radio access network apparatus according to the present disclosure.

Preferably, FIG. 13 is a schematic architecture diagram of a preferred radio access network apparatus according to the present disclosure, as can be seen, the radio access network apparatus further comprises: a storing module is configured to store the light connection information for the UE.

Figure 14:
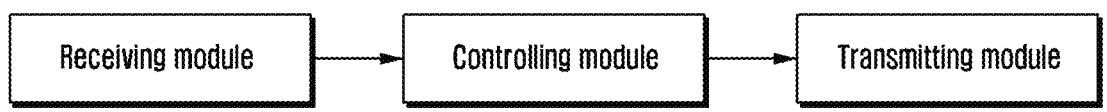
FIG. 14 is a schematic architecture diagram of a preferred user equipment according to the present disclosure.

FIG. 14 is a schematic architecture diagram of a preferred user equipment according to the present disclosure. As shown in FIG. 14, the user equipment comprises a receiving module, a controlling module and a transmitting module, wherein, the receiving module is configured to acquire light connection information for a UE;

the controlling module is configured to perform light connection control for the UE based on the light connection information for the UE; and the transmitting module is configured to transmit the light connection information for the UE to other devices.

Figure 15:
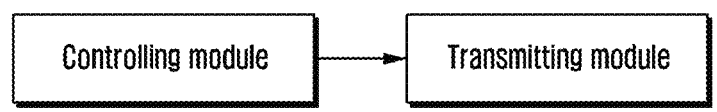
FIG. 15 is a schematic architecture diagram of a preferred network apparatus according to the present disclosure.
Figure 16:
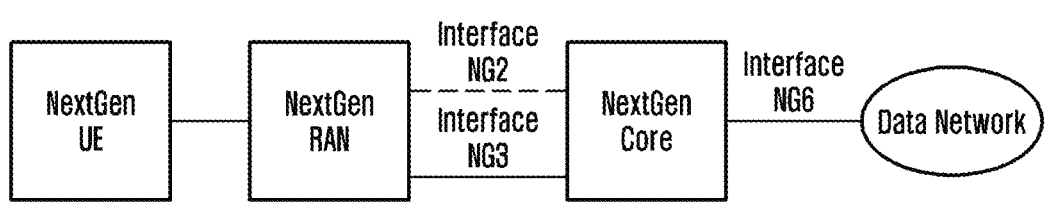
FIG. 16 is a schematic diagram of an initial system architecture of the next generation of network (5G) in the prior art.

FIG. 15 is a schematic architecture diagram of a preferred network apparatus according to the present disclosure. As shown in FIG. 15, the network apparatus comprises a controlling module and a transmitting module, wherein, the controlling module is configured to determine light connection information for the UE; and the transmitting module is configured to transmit the light connection information for the UE to other devices.

It can be seen from the above technical scheme that, by identifying the light connection information for the UE, the radio access network node is called as the main node controlled by the UE, which is closer to the UE, can be more flexible to control the UE, and can optimize the UE paging and mobility control. It is possible to save the signaling of UE connection release and UE connection setup, and to reduce the delay of accessing to the network for the UE.

The preceding description merely shows preferred embodiments of the present application and is not intended to limit the present application. Any modification, equivalent replacement or improvement made within the spirit and principle of the present application shall fall into the protection scope of the present application.

What is claimed is:

1. A method performed by a first base station in a communication system, the method comprising:
receiving, from a core network, inactive state assistance information;
determining whether a user equipment (UE) is moved to an inactive state based on the inactive state assistance information;
transmitting, to the UE, a control message for entering into the inactive state for the UE, the control message including an identifier associated with a context of the UE in the inactive state, in case that the UE is moved to the inactive state based on the inactive state assistance information; and
transmitting, to a second base station, a paging message including the identifier associated with the context of the UE in the inactive state,
wherein the inactive state is a state in which a connection between the UE and the core network is maintained, a connection between the UE and a base station is suspended, and the context of the UE is maintained.

2. The method of claim 1, wherein the control message further includes paging area information and paging cycle information.

3. The method of claim 2, wherein the paging area information includes at least one of a list of tracking areas or a list of cell identities.

4. The method of claim 1, wherein the inactive state assistance information includes at least one of discontinuous reception (DRX) information or mobility area information.

5. The method of claim 1, wherein the paging message further includes paging priority information.

6. The method of claim 1, further comprising:
receiving, from the UE, capability information including information indicating the UE supports the inactive state.

7. The method of claim 1, further comprising:
receiving, from the second base station, a request message for a retrieval of the context of the UE; and
transmitting, to the second base station, a response message as a response to the request message, the response message including the context of the UE.

8. A method performed by a second base station in a communication system, the method comprising:
receiving, from a first base station, a first paging message including an identifier associated with a context of a user equipment (UE) in an inactive state;
transmitting, to the UE, a second paging message for the UE based on the first paging message, the second paging message including the identifier associated with the context of the UE in the inactive state; and
receiving, from the UE, a control message for requesting resumption of a radio resource control (RRC) connection,
wherein the inactive state is a state in which a connection between the UE and a core network is maintained, a connection between the UE and a base station is suspended, and the context of the UE is maintained.

9. The method of claim 8, further comprising:
transmitting, to the first base station, a request message for a retrieval of the context of the UE; and
receiving, from the first base station, a response message as a response to the request message, the response message including the context of the UE.

10. The method of claim 9, further comprising:
transmitting, to the core network, a path switch request message after a complete of the resumption of the RRC connection; and
receiving, from the core network, a response message as a response to the path switch request message.

11. The method of claim 10, wherein the response message as a response to the path switch request message includes inactive state assistance information.

12. The method of claim 11, wherein the inactive state assistance information includes at least one of discontinuous reception (DRX) information or mobility area information.

13. The method of claim 8, wherein the first paging message further includes paging priority information.

14. A first base station in a communication system, the first base station comprising:
a transceiver; and
a controller coupled with the transceiver and configured to:
receive, from a core network, inactive state assistance information,
determine whether a user equipment (UE) is moved to an inactive state based on the inactive state assistance information,
transmit, to the UE, a control message for entering into the inactive state for the UE, the control message including an identifier associated with a context of the UE in the inactive state, in case that the UE is moved to the inactive state based on the inactive state assistance information, and
transmit, to a second base station, a paging message including the identifier associated with the context of the UE in the inactive state,
wherein the inactive state is a state in which a connection between the UE and the core network is maintained, a connection between the UE and a base station is suspended, and the context of the UE is maintained.

15. The first base station of claim 14,
wherein the control message further includes paging area information and paging cycle information.

16. The first base station of claim 15,
wherein the paging area information includes at least one of a list of tracking areas or a list of cell identities.

17. The first base station of claim 14, wherein the inactive state assistance information includes at least one of discontinuous reception (DRX) information or mobility area information.

18. The first base station of claim 14, wherein the paging message further includes paging priority information.

19. The first base station of claim 14, wherein the controller is further configured to receive, from the UE, capability information including information indicating the UE supports the inactive state.

20. The first base station of claim 14, wherein the controller is further configured to:
receive, from the second base station, a request message for a retrieval of the context of the UE, and
transmit, to the second base station, a response message as a response to the request message, the response message including the context of the UE.

21. A second base station in a communication system, the second base station comprising:
a transceiver; and
a controller coupled with the transceiver and configured to:
receive, from a first base station, a first paging message including an identifier associated with a context of a user equipment (UE) in an inactive state,
transmit, to the UE, a second paging message for the UE based on the first paging message, the second paging message including the identifier associated with the context of the UE in the inactive state, and
receive, from the UE, a control message for requesting resumption of a radio resource control (RRC) connection,
wherein the inactive state is a state in which a connection between the UE and a core network is maintained, a connection between the UE and a base station is suspended, and the context of the UE is maintained.

22. The second base station of claim 21, wherein the controller is further configured to:
transmit, to the first base station, a request message for a retrieval of the context of the UE, and
receive, from the first base station, a response message as a response to the request message, the response message including the context of the UE.

23. The second base station of claim 22, wherein the controller is further configured to:
transmit, to the core network, a path switch request message after a complete of the resumption of the RRC connection; and
receive, from the core network, a response message as a response to the path switch request message.

24. The second base station of claim 23, wherein the response message as a response to the path switch request message includes inactive state assistance information.

25. The second base station of claim 24, wherein the inactive state assistance information includes at least one of discontinuous reception (DRX) information or mobility area information.

26. The second base station of claim 21, wherein the first paging message further includes paging priority information.

* * * * *